(12) United States Patent
Tsukagoshi

(10) Patent No.: US 10,791,311 B2
(45) Date of Patent: Sep. 29, 2020

(54) TRANSMITTING APPARATUS, TRANSMITTING METHOD, RECEIVING APPARATUS, AND RECEIVING METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/249,278

(22) Filed: Jan. 16, 2019

(65) Prior Publication Data

US 2019/0166346 A1 May 30, 2019

Related U.S. Application Data

(63) Continuation of application No. 15/504,988, filed as application No. PCT/JP2015/003866 on Jul. 31, 2015, now Pat. No. 10,225,539.

(30) Foreign Application Priority Data

Aug. 28, 2014 (JP) .................................. 2014-173898

(51) Int. Cl.
*H04N 9/77* (2006.01)
*G09G 5/00* (2006.01)
(Continued)

(52) U.S. Cl.
CPC ............... *H04N 9/77* (2013.01); *G09G 5/003* (2013.01); *H04N 5/20* (2013.01); *H04N 19/186* (2014.11);
(Continued)

(58) Field of Classification Search
CPC .... H04N 9/77; H04N 21/2343; H04N 19/186; H04N 19/70; H04N 19/46;
(Continued)

(56) References Cited

U.S. PATENT DOCUMENTS 6,560,285 B1 5/2003 Reitmeier et al.
8,248,486 B1 8/2012 Ward et al.
(Continued)

FOREIGN PATENT DOCUMENTS

JP    7-364580 A    10/1995
JP    2002-510177 A    4/2002
(Continued)

OTHER PUBLICATIONS

Machine translation for JP 2016-12767 (Year: 2014).*
(Continued)

*Primary Examiner* — Qian Yang
(74) *Attorney, Agent, or Firm* — Oblon, McClelland, Maier & Neustadt, L.L.P.

(57) ABSTRACT

The luminance atmosphere that the creator intends is excellently reproduced on the receiving end. The transmission video data is obtained by applying a predetermined opto-electrical transfer function to the input video data. The transmission video data is transmitted together with the luminance conversion acceptable range information about a set region in the screen. For example, a transmitting unit transmits a video stream obtained by encoding the transmission video data while inserting the luminance conversion acceptable range information into a layer of the video stream. The receiving end obtains display video data by applying an electro-optical transfer function corresponding to the predetermined opto-electrical transfer function to the transmission video data, and performing a luminance conversion process in each of the set regions independently in accordance with the luminance conversion acceptable range information.

20 Claims, 15 Drawing Sheets

(51) Int. Cl.
*H04N 5/20* (2006.01)
*H04N 21/2343* (2011.01)
*H04N 19/46* (2014.01)
*H04N 19/70* (2014.01)
*H04N 19/186* (2014.01)
*H04N 5/235* (2006.01)
*H04N 5/262* (2006.01)
*H04N 19/176* (2014.01)
*H04N 19/85* (2014.01)
*H04N 19/98* (2014.01)

(52) U.S. Cl.
CPC ............. *H04N 19/46* (2014.11); *H04N 19/70* (2014.11); *H04N 21/2343* (2013.01); *H04N 21/234345* (2013.01); *G09G 2370/00* (2013.01); *G09G 2370/022* (2013.01); *G09G 2370/18* (2013.01); *H04N 5/2355* (2013.01); *H04N 5/2622* (2013.01); *H04N 19/176* (2014.11); *H04N 19/85* (2014.11); *H04N 19/98* (2014.11)

(58) Field of Classification Search
CPC .. H04N 21/234345; H04N 5/20; H04N 19/98; H04N 19/85; H04N 19/176; H04N 5/2622; H04N 5/2355; H04N 21/4402; G09G 5/003; G09G 2370/022; G09G 2370/00; G09G 2370/18
See application file for complete search history.

(56) References Cited

U.S. PATENT DOCUMENTS

| RE43,647 E | 9/2012 | Reitmeier et al. | |
|---|---|---|---|
| 2003/0202589 A1 | 10/2003 | Reitmeier et al. | |
| 2011/0026422 A1* | 2/2011 | Ma | H04W 72/0453 370/252 |
| 2012/0327291 A1 | 12/2012 | Takeuchi | |
| 2014/0049606 A1 | 2/2014 | Tsukagoshi | |
| 2014/0056520 A1* | 2/2014 | Rodriguez Serrano | G06K 9/325 382/174 |
| 2014/0210847 A1 | 7/2014 | Knibbeler et al. | |
| 2014/0225941 A1 | 8/2014 | Van Der Vleuten et al. | |

FOREIGN PATENT DOCUMENTS

| JP | 2006-14086 A | | 1/2006 |
|---|---|---|---|
| JP | 2009-512027 A | | 3/2009 |
| JP | 2016-12767 | * | 6/2014 |
| WO | 00/64185 A1 | | 10/2000 |
| WO | 2013/046095 A1 | | 4/2013 |
| WO | WO 2013/046095 | * | 4/2013 |
| WO | WO 2013/144809 A2 | | 10/2013 |
| WO | WO 2014/002901 A2 | | 1/2014 |

OTHER PUBLICATIONS

Office Action dated Apr. 3, 2018 in corresponding European Patent Application No. 15 753 501.4, 6 pages.
Office Action dated Dec. 19, 2017 in corresponding Japanese Patent Application No. 2014-173898, 6 pages.
Sally Hattori et al., "HLS: SEI Message for Knee Function Information", Joint Collaborative Team on Video Coding (JCT-VC) of ITU-T SG 16 WP3 and ISO/IEC JTC 1/SC 29/WG 11, 16$^{th}$ Meeting: San Jose, US, Jan. 15, 2014, Document: JCTVC-P0050-v2, pp. 1-21 and cover pages.
Chad Fogg et al., "VUI Entries for YXZ and Digital Cinema EOTF", Joint Collaborative Team on Video Coding (JCT-VC) of ITU-T SG 16 WP 3 and ISO/IEC JTC 1/SC 29/WG 11, 17$^{th}$ Meeting: Valencia, ES, Apr. 1, 2014, Document: JCTVC-Q0084r1, pp. 1-2 and cover page.
Benjamin Bross et al., "High Efficiency Video Coding (HEVC) Text Specification Draft 10 (for FDIS & Consent)," Joint Collaborative Team, on Video Coding (JCT-VC) of ITU-T SG 16 WP 3 and ISO-IEC JTC 1/SC 29/WG 11, 12$^{th}$ Meeting: Geneva, CH, Jan. 14-23, 2013, 334 pages.
B. Bross, et al., "High Efficiency Video Coding (HEVC) text specification draft 10 (for FDIS & Consent)," Joint Collaborative Team on Video Coding (JCT-VC) of ITU-T SG 16 WP 3 and ISO-IEC JTC 1/SC 29/WG 11. 12$^{th}$ Meeting, Geneva, CH, Jan. 14-23, 2013, 303 pages.
T. Ogura, "HDR proposal," Sony, TV Platform Div., Sony Visual Products, XP 2745637 A, 2014, 14 pages.
S. Hattori, et al., "SEI message for Knee Function Information," Sony, JCTVC-P0050, XP 2745638 A, 2014, 4 pages.
International Search Report dated Oct. 20, 2015 in PCT/JP2015/003866, filed Jul. 31, 2015.
Japanese Office Action dated May 21, 2019 in Japanese Patent Application No. 2018-084796 (with unedited computer-generated English translation), 14 pages.
Office Action dated Mar. 5, 2019 in Japanese Patent Application No. 2018-084796, 10 pages (with English translation).
Combined Chinese Office Action and Search Report dated Apr. 4, 2019 in corresponding Chinese Patent Application No. 201580044929.7 (with English Translation), 14 pages.
Japanese Office Action dated Oct. 15, 2019 in Japanese Patent Application No. 2018-084796 (with English translation), 12 pages.
Extended European Search Report dated Oct. 23, 2019 in European Patent Application No. 19190967.0, 12 pages.
"HDR Proposal", Retrieved from the Internet: URL: https://wikileaks.org/sony/docs/05/docs/HDR/HDR_Sony%E6%8F%90%E6%A1%88_140717_Body.pptx.pdf ,Jul. 16, 2014, XP002745637, 27 pages.
"SEI message for Knee Function Information", Retrieved from the Internet: URL: http://phenix.it-sudparis.eu/jct/doc_end_user/current_document.php?id=8538 , Jan. 15, 2014, XP002745638, 7 pages.

* cited by examiner

FIG. 8

Regional_Level_mapping SEI syntax

| Syntax | No. of Bits | Format |
|---|---|---|
| Regional_Level_mapping SEI ( ) { | | |
|   Regional_level_mapping_id | ue(v) | |
|   level_mapping_cancel_flag | u(1) | bmlbf |
|   if( !level_mapping_cancel_flag ) { | | |
|     coded_data_bit_depth | 8 | uimslbf |
|     reference_white_level | 16 | uimslbf |
|     reference_white_level_code_value | 16 | uimslbf |
|     number_of_regions | 8 | uimslbf |
|     // Global threshold | | |
|     global_compliant_threshold_level | 16 | uimslbf |
|     global_compliant_threshold_level_value | 16 | uimslbf |
|     for ( I = 0; I < number_of_regions; I++ ){ | | |
|       position_start_x | 16 | uimslbf |
|       position_start_y | 16 | uimslbf |
|       position_end_x | 16 | uimslbf |
|       position_end_y | 16 | uimslbf |
|       region_compliant_threshold_level | 16 | uimslbf |
|       region_compliant_threshold_level_value | 16 | uimslbf |
|     } | | |
|     peak_percentage | 8 | uimslbf |
|     peak_percentage_value | 16 | uimslbf |
|   } | | |
| } | | |

FIG. 9

Regional_Level_mapping SEI syntax

| Syntax | No. of Bits | Format |
|---|---|---|
| Regional_Level_mapping SEI ( ) { | | |
| regional_level_mapping_id | ue(v) | |
| level_mapping_cancel_flag | u(1) | bmlbf |
| if( !level_mapping_cancel_flag ) { | | |
| coded_data_bit_depth | 8 | uimslbf |
| reference_white_level | 16 | uimslbf |
| reference_white_level_code_value | 16 | uimslbf |
| number_of_regions | 8 | uimsbf |
| Block_size | 8 | uimsbf |
| global_compliant_threshold_level | 16 | |
| global_compliant_threshold_level_value | 16 | |
| for ( l = 0; l < number_of_regions; i++){ | | |
| block_start | 16 | uimslbf |
| block_end | 16 | uimslbf |
| region_compliant_threshold_level | 16 | uimslbf |
| region_compliant_threshold_level_value | 16 | uimslbf |
| } | | |
| peak_percentage | 8 | uimslbf |
| peak_percentage_value | 16 | uimslbf |
| } | | |
| } | | |

FIG. 10

| semantics | |
|---|---|
| coded_data_bit_depth (8bits) | NUMBER OF BITS OF ENCODED PIXEL. |
| reference_white_level (16bits) | VALUE IN cd/m2 WHEN LUMINANCE IS 100%. |
| reference_white_level_code_value (16bits) | LEVEL CODE VALUE WHEN LUMINANCE IS 100% AND VALUE WITH BIT PRECISION INDICATED IN coded_data_bit_depth. |
| global_compliant_threshold_level (16bits) | MAPPING DISPLAY THRESHOLD FOR WHOLE SCREEN. THRESHOLD IS HIGHEST LUMINANCE VALUE IN CE DISPLAY THAT CREATOR ASSUMES WHEN CREATOR INTENDS TO MAKE LUMINANCE IN CE DISPLAY CORRESPOND TO INPUT LUMINANCE, AND THRESHOLD IS USED TO INDICATE THAT LUMINANCE AT LEVEL EXCEEDING THRESHOLD IS DISPLAYED DEPENDING ON DISPLAY CAPACITY OF CE MONITOR. |
| global_compliant_threshold_level_value (16bits) | TRANSMISSION VALUE OF MAPPING DISPLAY THRESHOLD FOR WHOLE SCREEN. |
| number_of_regions (8bits) | NUMBER OF SET REGIONS IN SCREEN. |
| position_start_x (16bits) | HORIZONTAL START POSITION OF SET REGION IS INDICATED WITH NUMBER OF PIXELS WHEN TOP LEFT OF EFFECTIVE DISPLAY REGION IS SET AS ZERO. |
| position_start_y (16bits) | VERTICAL START POSITION OF SET REGION IS INDICATED WITH NUMBER OF PIXELS WHEN TOP LEFT OF EFFECTIVE DISPLAY REGION IS SET AS ZERO. |
| position_end_x (16bits) | HORIZONTAL END POSITION OF SET REGION IS INDICATED WITH NUMBER OF PIXELS WHEN TOP LEFT OF EFFECTIVE DISPLAY REGION IS SET AS ZERO. |
| position_end_y (16bits) | VERTICAL END POSITION OF SET REGION IS INDICATED WITH NUMBER OF PIXELS WHEN TOP LEFT OF EFFECTIVE DISPLAY REGION IS SET AS ZERO. |
| block_start (16bits) | BLOCK ID OF START BLOCK FROM WHICH SET REGIONS ARE SCANNED BLOCK BY BLOCK IN DIRECTION FROM TOP LEFT TO BOTTOM RIGHT OF SCREEN. |
| block_end (16bits) | BLOCK ID OF END BLOCK TO WHICH SET REGIONS ARE SCANNED BLOCK BY BLOCK IN DIRECTION FROM TOP LEFT TO BOTTOM RIGHT OF SCREEN. |
| region_compliant_threshold_level (16bits) | MAPPING DISPLAY THRESHOLD IN SET REGION. THRESHOLD IS HIGHEST LUMINANCE IN CE DISPLAY THAT CREATOR ASSUMES WHEN CREATOR INTENDS TO MAKE LUMINANCE IN SET REGION OF CE DISPLAY CORRESPOND TO INPUT LUMINANCE, AND THRESHOLD IS USED TO INDICATE THAT LUMINANCE OF SET REGION AT LEVEL EXCEEDING THRESHOLD IS DISPLAYED DEPENDING ON DISPLAY CAPACITY OF CE MONITOR. |
| region_compliant_threshold_level_value (16bits) | TRANSMISSION VALUE OF MAPPING DISPLAY THRESHOLD IN SET REGION. |
| peak_percentage (8bits) | VALUE OF PERCENTAGE OF HIGHEST LUMINANCE LEVEL TO 100% INDICATED BY CREATOR. (FOR EXAMPLE, peak_percentage OF PEAK LUMINANCE OF 1000cd/m2 IS 100%.) |
| peak_percentage_value (8bits) | LARGEST CODE VALUE OF peak_percentage WHEN DATA IS TRANSMITTED WITH BIT PRECISION INDICATED IN coded_data_bit_depth. (FOR EXAMPLE, HIGHEST VALUE 1019 IN 10-bit TRANSMISSION INDICATES 100% WHEN peak_percentage IS 100%.) |
| Block_size (8bits) | SIZE OF BLOCK. (EXAMPLES) 0x01 (8x8), 0x02 (16x16), 0x03 (32x32) etc. |

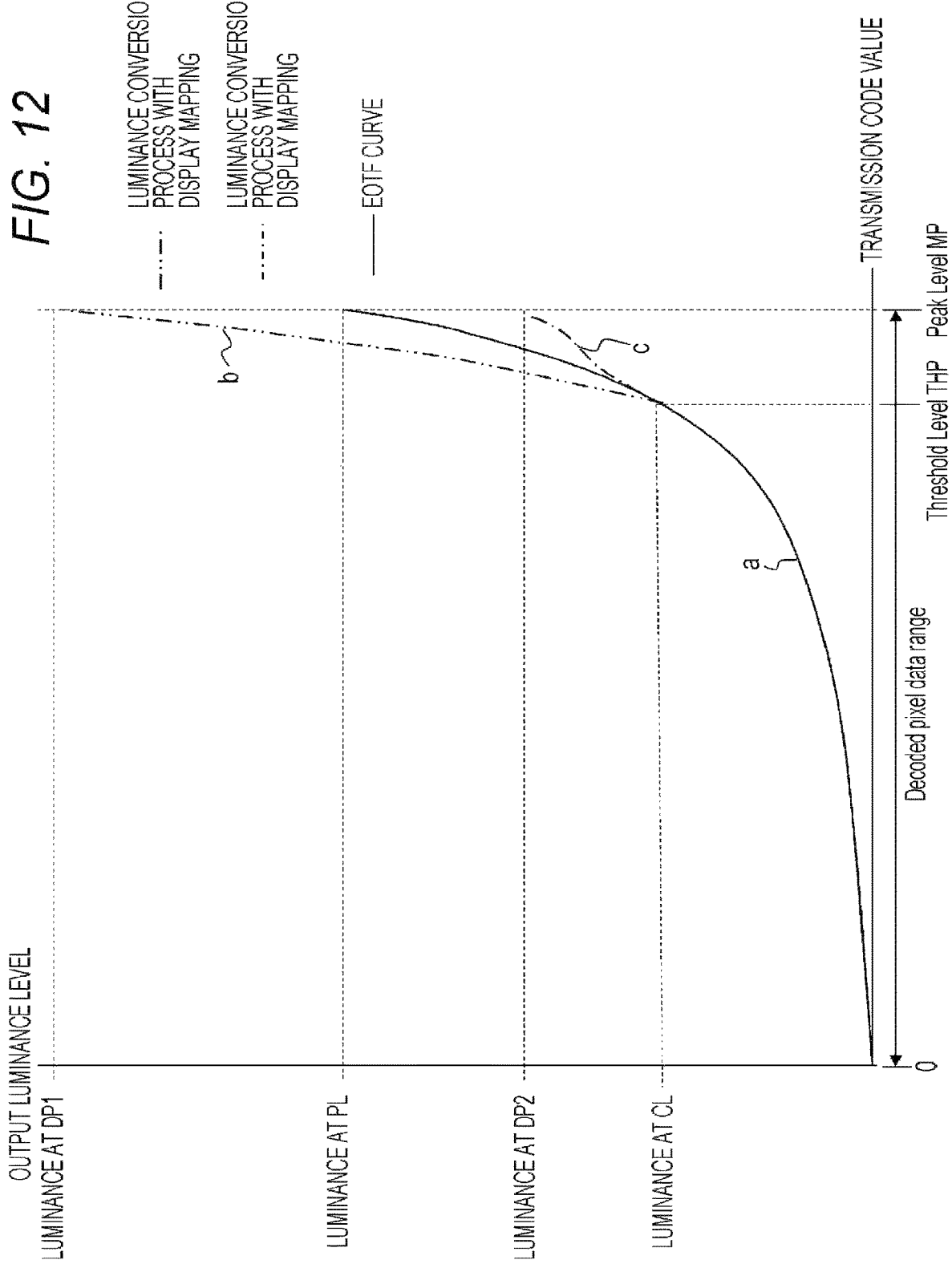

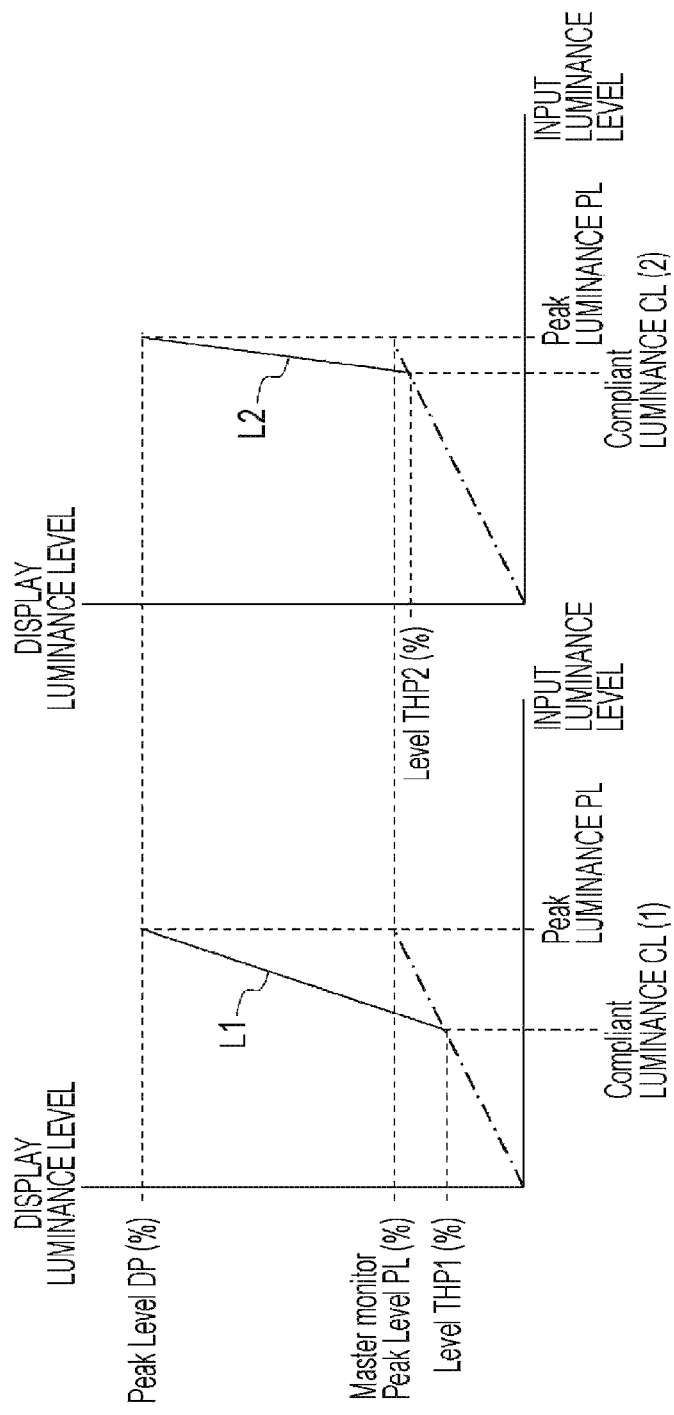

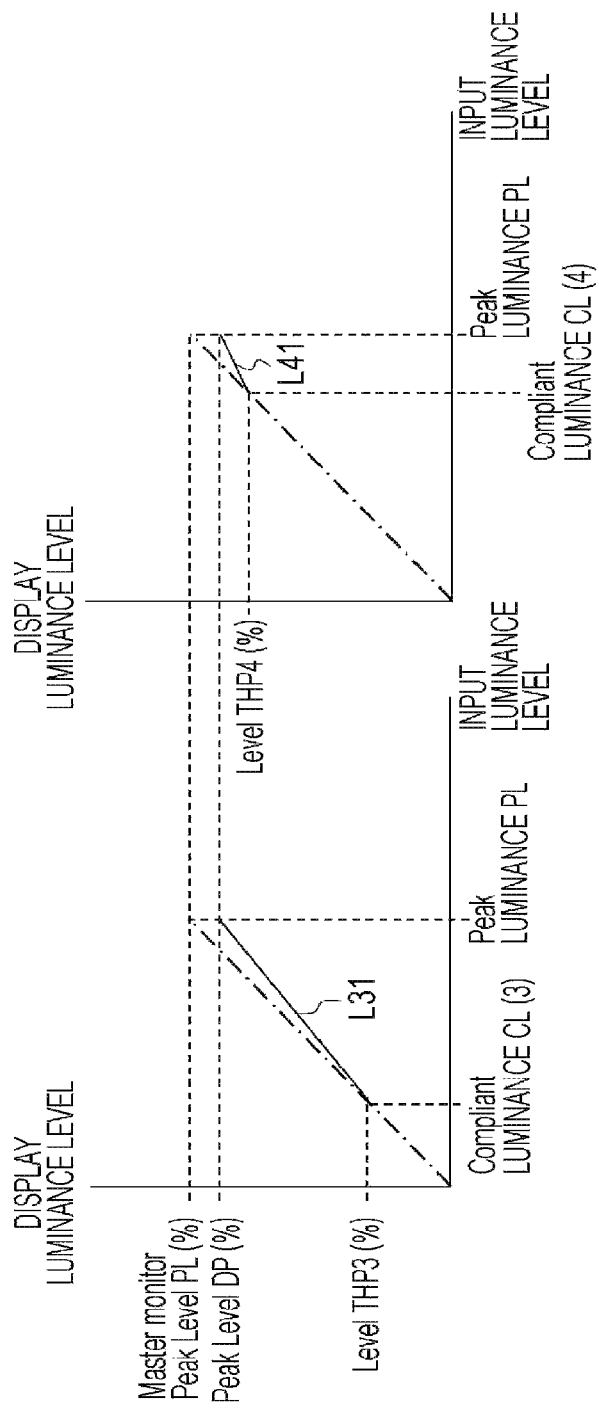

TRANSMITTING APPARATUS, TRANSMITTING METHOD, RECEIVING APPARATUS, AND RECEIVING METHOD

CROSS REFERENCE TO RELATED APPLICATIONS

This application is a continuation of U.S. Ser. No. 15/504,988 filed Feb. 17, 2017, which is a National Stage of PCT/JP2015/003866, filed Jul. 31, 2015 and claims the benefit of Japanese Priority Patent Application JP 2014-173898 filed on Aug. 28, 2014. The entire contents of each of which are incorporated herein by reference.

TECHNICAL FIELD

The present technology relates to a transmitting apparatus, a transmitting method, a receiving apparatus, and a receiving method and, in particular, relates to, for example, a transmitting apparatus that transmits transmission video data obtained by applying a predetermined opto-electrical transfer function to input video data.

BACKGROUND ART

A High Dynamic Range (HDR) imaging service provides an image with a wide luminance range to the receiving end and reproduces the image on the receiving end while reflecting the creator's intention on the image. This achieves display and reproduction of an image approaching the perception of the human eye in nature.

NPL 1 discloses, for example, a technique for transmitting a video stream generated by encoding transmission video data obtained by applying a gamma curve to input video data with luminance levels from 0 to 100%*N (the N is larger than one).

The levels of peak luminance of monitors (CE monitors) in receiving devices vary depending on the device property, the placement of the backlight, or the design method of a display panel. In comparison to the master monitor used for creating a program, the CE monitor sometimes has too high or dark luminance. Thus, the CE monitor may fail to correctly reproduce the luminance atmosphere that the creator intends.

CITATION LIST

Non Patent Literature

[NPL 1]
High Efficiency Video Coding (HEVC) text specification draft 10 (for FDIS & Last Call)

SUMMARY OF INVENTION

Technical Problem

It is desirable to excellently reproduce the luminance atmosphere that the creator intends on the receiving end.

Solution to Problem

According to an embodiment of the present technology, there is provided a transmitting apparatus including:
a processing unit configured to obtain transmission video data by applying a predetermined opto-electrical transfer function to input video data, and
a transmitting unit configured to transmit the transmission video data together with luminance conversion acceptable range information about a set region in a screen.

According to the present technology, a processing unit provides transmission video data by applying a predetermined opto-electrical transfer function to the input video data. For example, the input video data is video data including high dynamic range (HDR) images having contrast ratios from 0% to 100%*N (the N is a number larger than one) and having a brightness exceeding the brightness of the white peak value of an existing low dynamic range (LDR) image.

A transmitting unit transmits the transmission video data with the luminance conversion acceptable range information about a set region in the screen. For example, the set region in the screen may be set in the unit of pixel or in the unit of block including a predetermined number of pixels. Alternatively, for example, the transmitting unit may transmit the video stream obtained by encoding transmission video data, and may further include an information inserting unit configured to insert the luminance conversion acceptable range information into a layer of the video stream.

According to the present technology, transmission video data is transmitted together with the luminance conversion acceptable range information about a set region in the screen as descried above. This enables the receiving end to excellently reproduce the luminance atmosphere that the creator intends.

Note that, for example, the transmitting unit according to the present technology may transmit the transmission video data together with the luminance conversion acceptable range information about the entire screen in addition to the luminance conversion acceptable range information about the set region in the screen. In such a case, the receiving end can converts the luminance of the region other than the set region in the screen in a luminance conversion process in accordance with the luminance conversion acceptable range information about the entire screen.

According to an embodiment of the present technology, there is provided a receiving apparatus including:
a receiving unit configured to receive transmission video data obtained by applying a predetermined opto-electrical transfer function to input video data together with luminance conversion acceptable range information about a set region in a screen; and
a processing unit configured to obtain output video data by applying an electro-optical transfer function corresponding to the predetermined opto-electrical transfer function to the transmission video data, and converting luminance of the transmission video data in a luminance conversion process in accordance with the luminance conversion acceptable range information.

A receiving unit receives the transmission video data together with the luminance conversion acceptable range information about the set region in screen. The transmission video data is obtained by applying a predetermined opto-electrical transfer function to the input video data. For example, the input video data is video data including High Dynamic Range (HDR) images having contrast ratios from 0% to 100%*N (the N is a number larger than one) and having a brightness exceeding the brightness of the white peak value of an existing Low Dynamic Range (LDR) image.

For example, the set region in the screen may be set in the unit of pixel or in the unit of block including a predetermined number of pixels. For example, the receiving unit may receive the video stream obtained by encoding transmission video data, and the luminance conversion acceptable range information may be inserted in a layer in the video stream. Thus, the processing unit may applies, for example, an electro-optical transfer function that is inverse to the predetermined opto-electrical transfer function to the transmission video data, and outputs video data of which luminance is converted in accordance with the luminance conversion acceptable range information in a luminance conversion process.

According to the present technology, the transmission video data is received together with the luminance conversion acceptable range information about the set region in the screen such that the output video data is obtained by converting the luminance of the received data in accordance with the luminance conversion acceptable range information in a luminance conversion process as described above. This enables the receiving end to excellently reproduce the luminance atmosphere that the creator intends.

Note that, for example, the receiving unit according to the present technology may receive the transmission video data together with the luminance conversion acceptable range information about the entire screen in addition to the luminance conversion acceptable range information about the set region in the screen such that the processing unit can convert the luminance of the regions other than the set region in the screen in accordance with the luminance conversion acceptable range information about the entire screen in a luminance conversion process.

Advantageous Effects of Invention

The present technology enables a receiving end to excellently reproduce the luminance atmosphere that the creator intends. Note that the effects described herein are examples consistently. The present technology is not limited to the examples. Furthermore, the present technology may include an additional effect.

BRIEF DESCRIPTION OF DRAWINGS

FIG. 8 is a diagram of an exemplary configuration of a regional level mapping SEI message.

FIG. 9 is a diagram of another exemplary configuration of a regional level mapping SEI message.

FIG. 10 is a diagram of the contents of primary information in an exemplary configuration of a regional level mapping SEI message.

FIG. 12 is a diagram of an exemplary electro-optical transfer function (EOTF).

FIGS. 13A and 13B are diagrams of an exemplary display luminance characteristic of a CE monitor when the highest luminance display capacity DP of the CE monitor is higher than the highest luminance PL assumed in the master monitor.

FIGS. 14A and 14B are diagrams of an exemplary display luminance characteristic of a CE monitor when the highest luminance display capacity DP of the CE monitor is lower than the highest luminance PL assumed in the master monitor.

DESCRIPTION OF EMBODIMENTS

Figure 1:
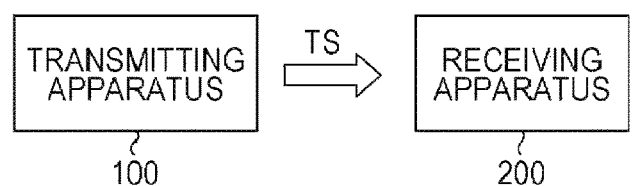
FIG. 1 is a block diagram of an exemplary configuration of a transmitting and receiving system as an embodiment.

Hereinafter, a configuration to implement the present technology (hereinafter, referred to as an "embodiment") will be described in the following order.
1. Embodiment
2. Variation 1. Embodiment Exemplary Configuration of Transmitting and Receiving System FIG. 1 illustrates an exemplary configuration of a transmitting and receiving system 10 as an embodiment. The transmitting and receiving system 10 includes a transmitting apparatus 100 and a receiving apparatus 200.

The transmitting apparatus 100 generates a transport stream TS in MPEG-2 as a container to transmit the transport stream TS through broadcast waves or with packets on a network. The transport stream TS includes a video stream obtained by encoding transmission video data obtained by applying a predetermined opto-electrical transfer function to input video data.

For example, the input video data includes High Dynamic Range (HDR) images having contrast ratios from 0% to 100%*N (the N is a number larger than one) and having a brightness exceeding the brightness of the white peak value of an existing Low Dynamic Range (LDR) image. It is assumed herein that the level of 100% is a luminance level corresponding to a white luminance value of 100 cd/m2.

The luminance conversion acceptable range information about a set region in the screen and the luminance conversion acceptable range information about the entire screen is inserted in a layer of the video stream. The luminance conversion acceptable range information will be described in detail below.

The receiving apparatus 200 receives the transport stream TS transmitted from the transmitting apparatus 100 through broadcast waves or with packets on a network. The transport stream TS includes a video stream including encoded video data. The luminance conversion acceptable range information about a set region in the screen and the luminance conversion acceptable range information about the entire screen is inserted in the video stream as described above.

The receiving apparatus 200 obtains output video data by applying, for example, an electro-optical transfer function that is in inverse to the predetermined opto-electrical transfer function on the transmitting end to the transmission video data, and converting the luminance of the data in accordance with the luminance conversion acceptable range information in a luminance conversion process. In such a case, the luminance of the data only in the luminance conversion acceptable range is converted, for example, depending on the peak luminance of the monitor.

Exemplary Configuration of Transmitting Apparatus

Figure 2:
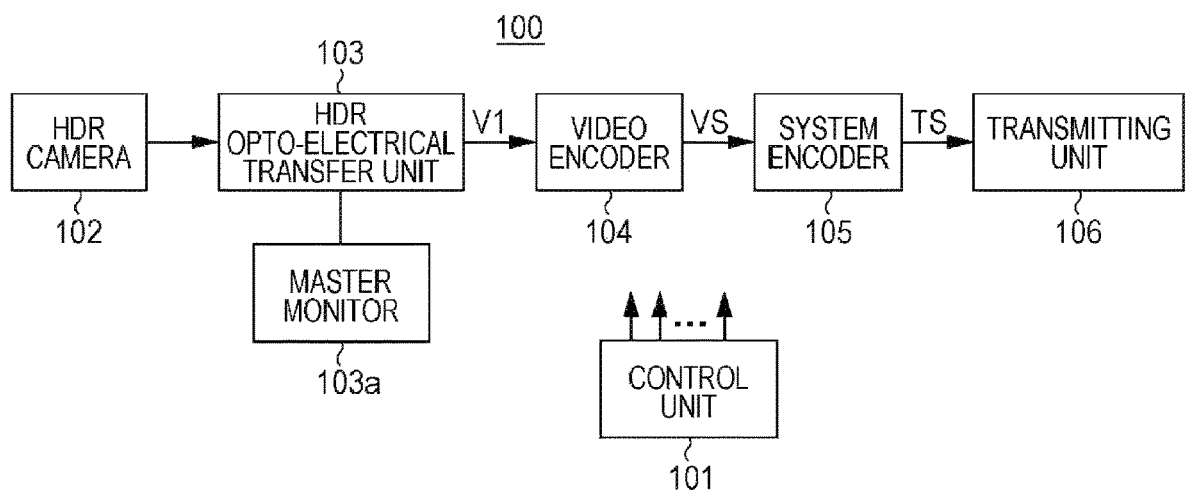
FIG. 2 is a block diagram of an exemplary configuration of a transmitting apparatus including the transmitting and receiving system.

FIG. 2 illustrates an exemplary configuration of the transmitting apparatus 100. The transmitting apparatus 100 includes a control unit 101, an HDR camera 102, an HDR opto-electrical transfer unit 103, a video encoder 104, a system encoder 105, and a transmitting unit 106. The control unit 101 includes a central processing unit (CPU) to control the operation of each of the components in the transmitting apparatus 100 in accordance with a control program.

The HDR camera 102 captures an image of an object and outputs High Dynamic Range (HDR) video data. The HDR video data has contrast ratios from 0 to 100%*N (the N is a number larger than one), for example, from 0 to 1000% and has a brightness exceeding the brightness of the white peak value of an existing Low Dynamic Range (LDR) image. Note that herein the level of 100% corresponds, for example, to a white luminance value of 100 cd/m2. Note that the "cd/m2" indicates "cd/square meter".

The master monitor 103a is configured to grade the HDR video data obtained with the HDR camera 102. The master monitor 103a includes the display luminance levels appropriate to HDR video data, or appropriate for grading HDR video data.

Figure 3:
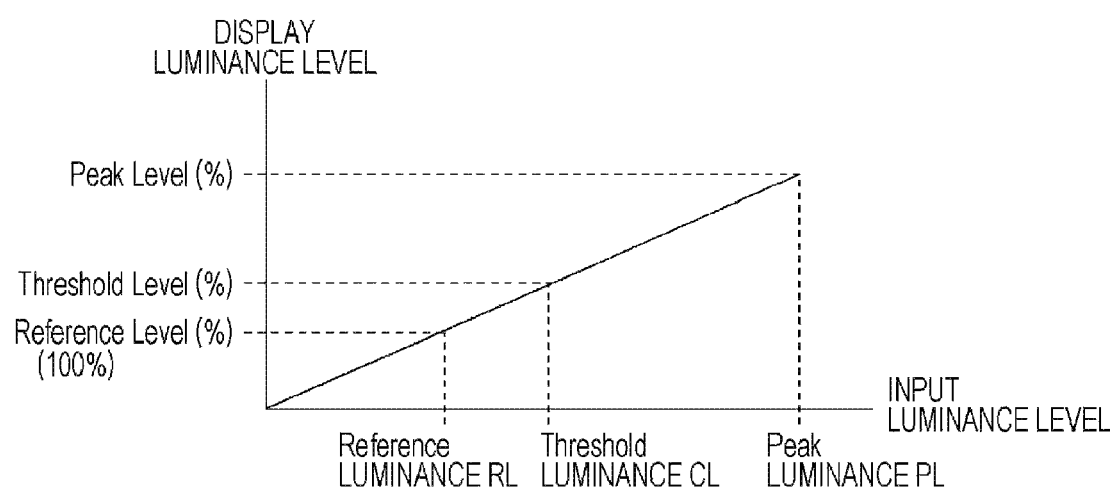
FIG. 3 is a diagram of an exemplary display luminance characteristic of a master monitor.

FIG. 3 illustrates the display luminance characteristic of the master monitor 103a. In the drawing, the input luminance level is shown on the horizontal axis, and the display luminance level is shown on the vertical axis. When the input luminance level is at a reference luminance RL, the display luminance level is at the reference level (%), for example, of 100% that corresponds to the white luminance value of 100 cd/m2. When the input luminance level is at a peak luminance PL, the display luminance level is at the peak level (%).

Note that a threshold luminance CL is newly defined in the present embodiment, and indicates the boundary between the region of which input luminance corresponds to the luminance when the region is displayed in the monitor (CE monitor) on the receiving device, and the region of which luminance depends on the CE monitor. When the monitor input luminance level is at the threshold luminance CL, the display luminance level is at the threshold level (%).

With reference to FIG. 2 again, the HDR opto-electrical transfer unit 103 obtains transmission video data V1 by applying an opto-electrical transfer function for HDR images (an HDR OETF curve) to the HDR video data obtained with the HDR camera 102.

Figure 4:
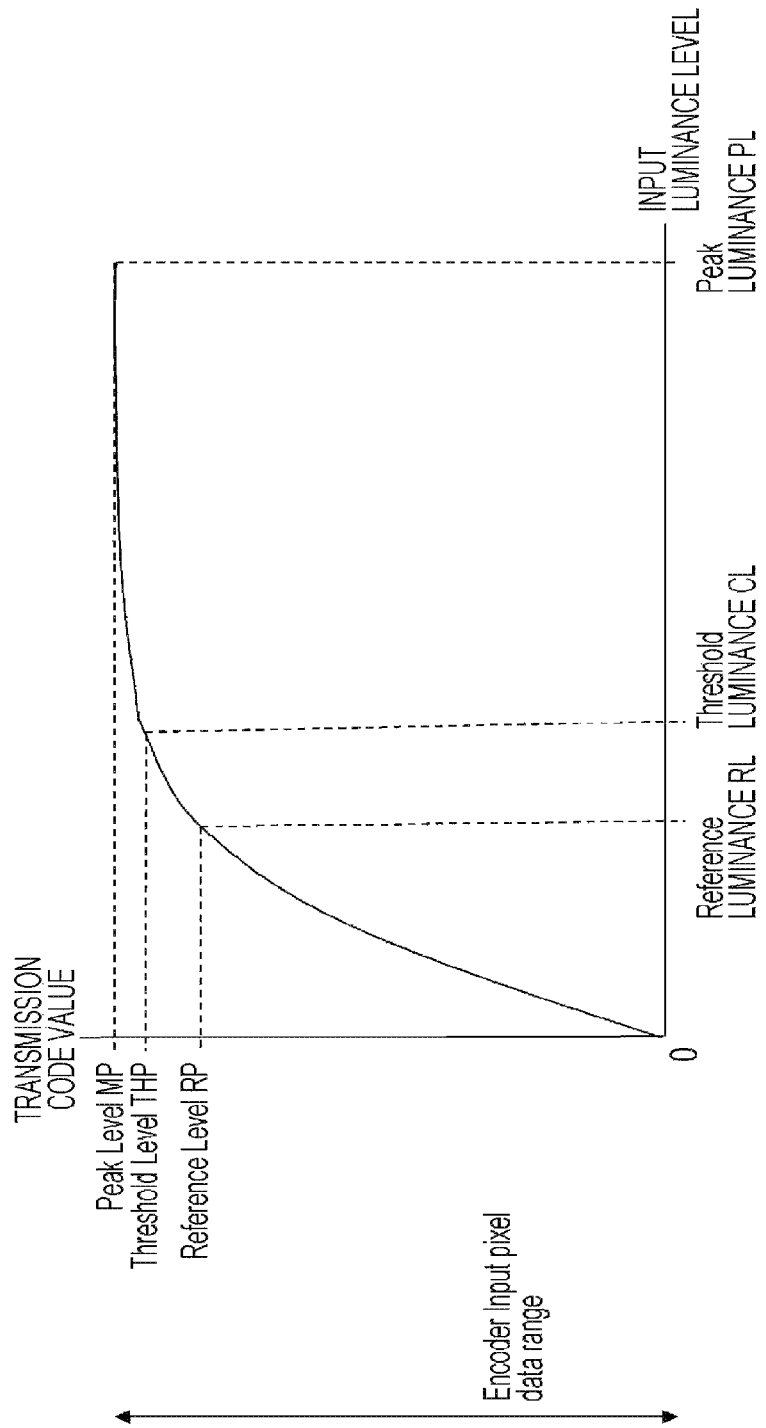
FIG. 4 is a diagram of an exemplary opto-electrical transfer function (OETF)

FIG. 4 illustrates an exemplary opto-electrical transfer function (OETF). In the drawing, the input luminance level is shown on the horizontal axis, similarly to the horizontal axis of the display luminance characteristic of the master monitor (see FIG. 3), and a transmission code value is shown on the vertical axis. When the input luminance level is at the reference luminance RL, the transmission code value is at a reference level RP. When the input luminance level is at the peak luminance PL, the transmission code value is at a peak level MP. When the input luminance level is at the threshold luminance CL, the transmission code value is at a threshold level THP.

Note that the range of the transmission code value on the vertical axis corresponds to the input pixel data range (Encoder input pixel data range) of the video encoder 104. For example, when data is encoded in 10-bit encoding, the range is from "64" to "940", or from "4" to "1019" using the expanded region.

With reference to FIG. 2 again, the video encoder 104 obtains encoded video data by encoding the transmission video data V1, for example, with MPEG-4 AVC encoding, MPEG-2 video encoding, or high Efficiency Video Coding (HEVC) encoding. The video encoder 104 includes a stream formatter (not illustrated) at the latter part to generate a video stream (video elementary stream) including the encoded video data. At that time, the video encoder 104 inserts the luminance conversion acceptable range information about a set region in the screen and the luminance conversion acceptable range information about the entire screen into a layer of the video stream.

Insertion of Luminance Conversion Acceptable Range Information

The insertion of the luminance conversion acceptable range information will be described in detail. According to the present embodiment, a regional level mapping SEI message (Regional_Level_mapping SEI message) that is newly defined is inserted in the part of "SEIs" in an access unit (AU).

Figure 5:
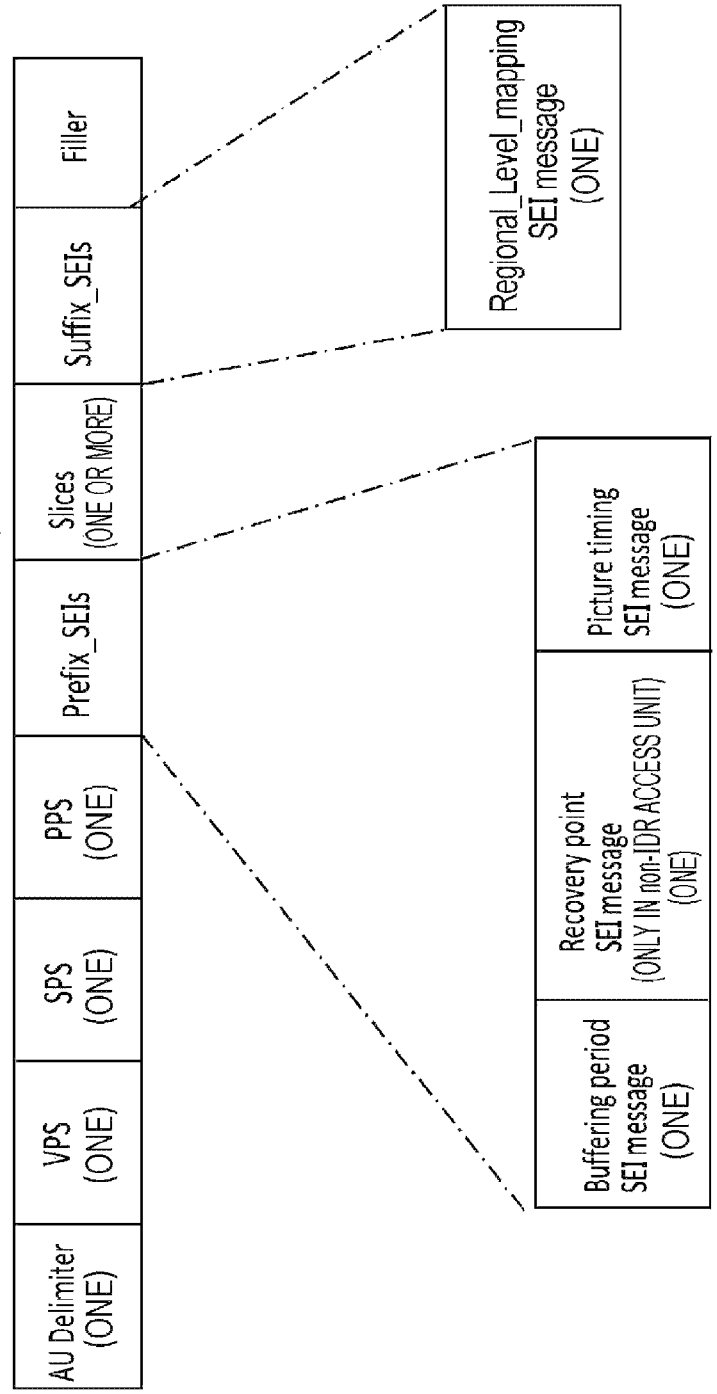
FIG. 5 is a diagram of the head access unit of a GOP when the data is encoded with an HEVC encoding method.
Figure 6:
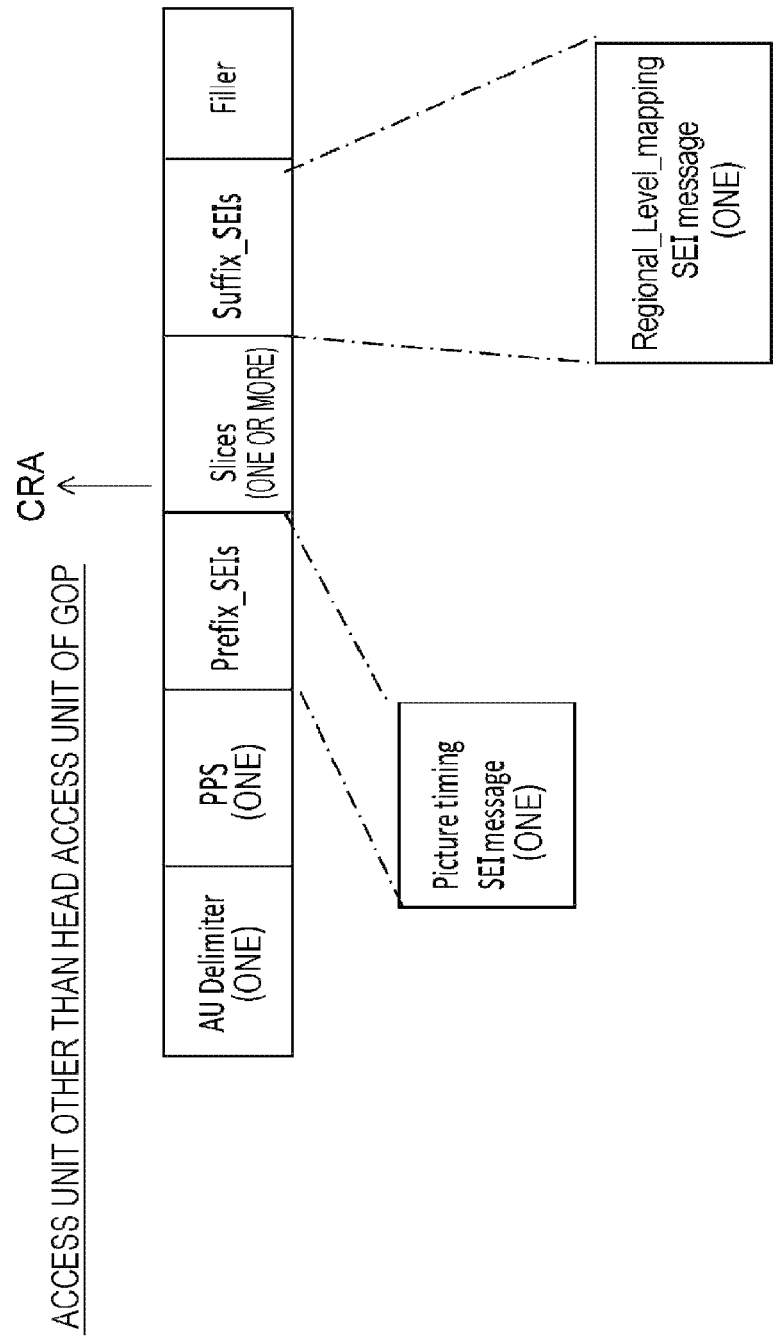
FIG. 6 is a diagram of an access unit other than the head access unit of a GOP when the data is encoded with an HEVC encoding method.

FIG. 5 illustrates the head access unit of a Group Of Pictures (GOP) when the data is encoded with an HEVC encoding method. FIG. 6 illustrates an access unit other than the head access unit of a GOP when the data is encoded with an HEVC encoding method. When data is encoded with an HEVC encoding method, an SEI message group "Prefix_SEIs" for decoding is placed before slices in which pixel data is encoded, and an SEI message group "Suffix_SEIs" for displaying is placed after the slices. As illustrated in FIGS. 5 and 6, the regional level mapping SEI message is places as an SEI message group "Suffix_SEIs".

Figure 7A:
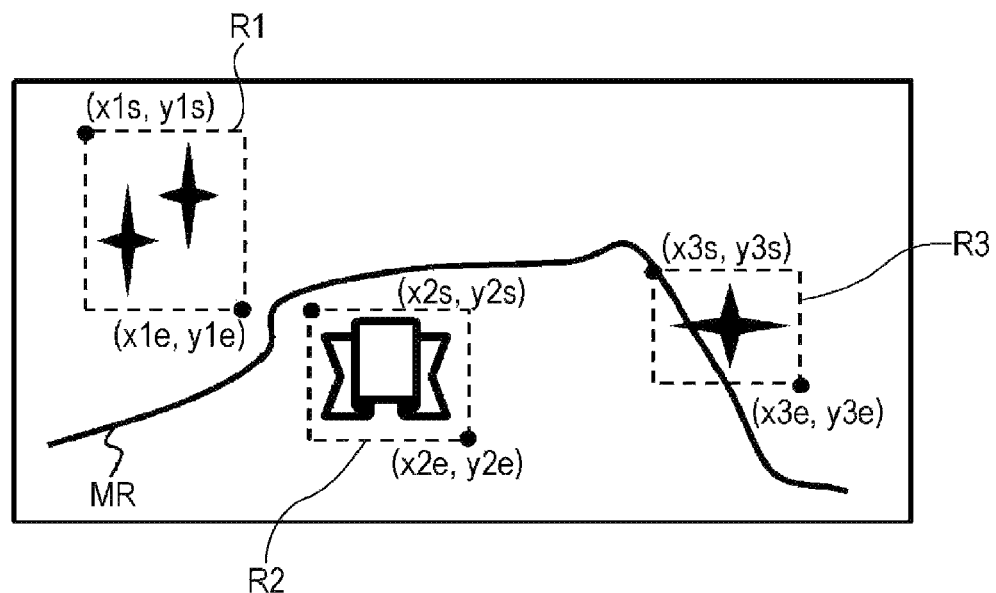
FIGS. 7A and 7B are diagrams to describe that set regions in a screen is set in the unit of pixel or in the unit of block including a predetermined number of pixels.

A set region in a screen is set in the unit of pixel or in the unit of block including a predetermined number of pixels. FIG. 7A illustrates an example of set regions set in the unit of pixel. In the illustrated example, a line MR is the ridge of a mountain, and regions R1 and R3 including stars and a region R2 including a neon-light sign are set as set regions. The thing that the creator intends about the regions R1 and R3 is to merely display the twinkle of the stars. Meanwhile, the creator intends to maintain the texture of the neon-light sign in the region R2 although the region R2 has a high luminance.

Each of the set regions has a rectangle shape and is identified with the pixel coordinates on the top left and the pixel coordinates on the bottom right. In other words, the region R1 is identified with pixel coordinates (x1s, y1s) on the top left and pixel coordinates (x1e, y1e) on the bottom right. The region R2 is identified with pixel coordinates (x2s, y2s) on the top left and pixel coordinates (x2e, y2e) on the bottom right. The region R3 is identified with pixel coordinates (x3s, y3s) on the top left and pixel coordinates (x3e, y3e) on the bottom right.

Figure 7B:
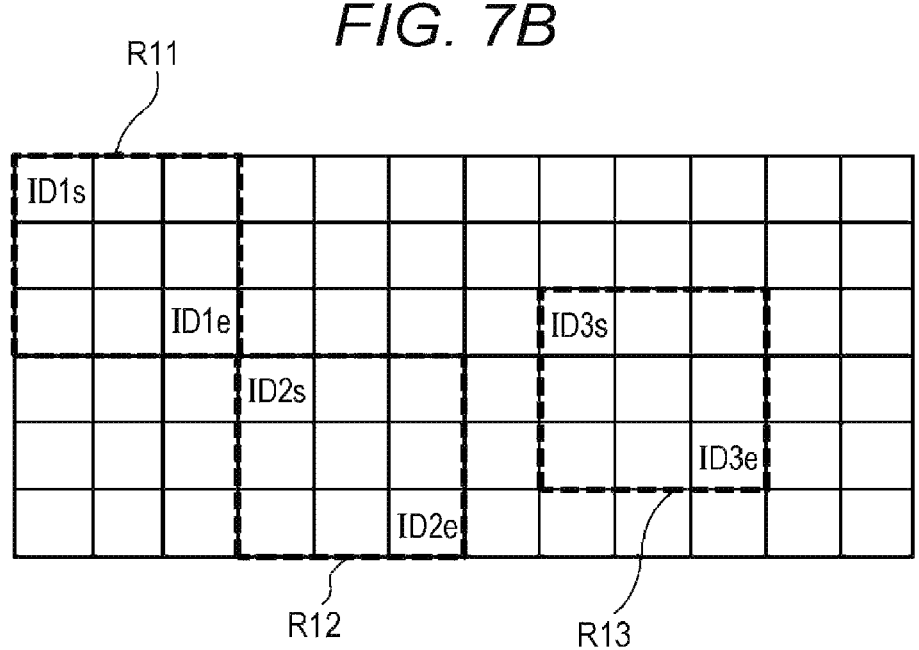

FIG. 7B illustrates an example of set regions set in the unit of block. The screen is divided into a plurality of blocks in horizontal directions and vertical directions. For example, a block has a size of 8*8 pixels, 16*16 pixels, 32*32 pixels, or another size. Each of the blocks is denoted with a block ID. In the illustrated example, regions R11, R12, and R13 are set as set regions.

Each of the set regions has a rectangle shape and is identified with the block ID on the top left and the block ID on the bottom right. In other words, the region R11 is identified with a block ID (ID1s) on the top left and a block ID (ID1e) on the bottom right. The region R12 is identified with a block ID (ID2s) on the top left and a block ID (ID2e) on the bottom right. The region R13 is identified with a block ID (ID3s) on the top left and a block ID (ID3e) on the bottom right.

FIG. 8 illustrates exemplary formation (Syntax) of a regional level mapping SEI message when the set regions are set in the unit of pixel. FIG. 9 illustrates exemplary formation (Syntax) of a regional level mapping SEI message when the set regions are set in the unit of block. FIG. 10 illustrates the contents (Semantics) of the primary information in the exemplary formation.

The "level_mapping_cancel_flag" is flag information of a bit. The "1" indicates the cancelation of the previous state of the level mapping (Level_mapping) message. The "0" indicates that each element is transmitted and the previous state is refreshed with the element.

The eight-bit field of the "coded_data_bit_depth" indicates the bit length of the encoded data, and is, for example, a length of 8 to 14 bits. The 16-bit field of the "reference_white_level" is the input luminance value when the display luminance is at 100% in the master monitor 103a, namely, the reference luminance RL. The 16-bit field of the "reference_white_level_code_value" indicates the level code value is at the luminance of 100% and the value with the bit precision indicated in the "coded_data_bit_depth", namely, the reference level RP.

The eight-bit field of the "number_of_regions" indicates the number of set regions in a screen. The 16-bit field of the "global_compliant_threshold_level" is a mapping display threshold for the entire screen. The mapping display threshold is the highest luminance value in CE display that the creator assumes when the creator intends to make the luminance in the CE display correspond to the input luminance. The mapping display threshold is used to indicate that the luminance at a level exceeding the mapping display threshold is displayed depending on the display capacity of the CE monitor. The 16-bit field of the "global_compliant_threshold_level_value" indicates the transmission value (transmission code value) of the mapping display threshold for the entire screen.

The 16-bit field of the "position_start_x" and the 16-bit field of the "position_start_y" indicate the pixel coordinates on the top left identifying a set region. In other words, the "position_start_x" indicates the horizontal start position of a set region with the number of pixels when the top left of an effective display region is set at zero. The "position_start_y" indicates the vertical start position of a set region with the number of pixels when the top left of an effective display region is set at zero.

The 16-bit field of the "position_end_x" and the 16-bit field of the "position_end_y" indicate the pixel coordinates on the bottom right identifying a set region. In other words, the "position_end_x" indicates the horizontal end position of a set region with the number of pixels when the top left of an effective display region is set at zero. The "position_end_y" indicates the vertical end position of a set region with the number of pixels when the top left of an effective display region is set at zero.

The 16-bit field of the "block_start" indicates the block ID on the top left identifying a set region. In other words, the "block_start" indicates the ID (block ID) of a start block from which the set regions are scanned in a direction from the top left to the bottom right block by block. The 16-bit field of the "block_end" indicates the block ID on the bottom right identifying a set region. In other words, the "block_end" indicates the ID (block ID) of an end block to which the set regions are scanned in a direction from the top left to the bottom right block by block. The eight-bit field of the "block_size" indicates the size of the block that is the unit to designate a set region. For example, the block size is designated in the range of 8×8 pixels when the value is "0x01", the block size is designated in the range of 16×≠pixels when the value is "0x02", or the block size is designated in the range of 32×32 pixels when the value is "0x03".

The 16-bit field of the "region_compliant_threshold_level" is a mapping display threshold for the set region. The mapping display threshold is the highest luminance value in the set region in CE display that the creator assumes when the creator intends to make the luminance in the set region in the CE display correspond to the input luminance. The mapping display threshold is used to indicate that the luminance in the set region at a level exceeding the mapping display threshold is displayed depending on the display capacity of the CE monitor. The 16-bit field of the "region_compliant_threshold_level_value" indicates a transmission value (transmission code value) of the mapping display threshold in the set region.

The eight-bit field of the "peak_percentage" indicates a value of the percent of the highest luminance level to 100%. The value is indicated by the creator. For example, the "peak_percentage" of the peak luminance of 1000 cd/m2 is 1000%. In that case, the 100% is indicated as a value 1, and the 1000% is 10 times the 100% and is indicated as a value 10. The 16-bit field of the "peak_percentage_value" indicates the largest code value of the "peak_percentage" when the data is transmitted with the bit precision indicated in the "coded_data_bit_depth", namely, the peak level MP. For example, when the "peak_percentage" is 1000%, the highest value "1019" in 10-bit transmission indicates the 1000%.

The information of the "global_compliant_threshold_level" and "global_compliant_threshold_level_value" in the regional level mapping SEI message is included in the luminance conversion acceptable range information about the entire screen. The information of the "region_compliant_threshold_level" and "region_compliant_threshold_level_value" is included in the luminance conversion acceptable range information about a set region in the screen. This enables the receiving end to detect the luminance conversion acceptable range information about a set region and detect also the luminance conversion acceptable range information about the other regions from the regional level mapping SEI message.

In such a case, the luminance conversion acceptable range information may be designated picture by picture, scene by scene, or program by program. Note that the type of the OETF (opto-electrical transfer function) to be used is transmitted in video usability information (VUI) to the NAL unit of a sequence parameter set (SPS).

With reference to FIG. 2 again, the system encoder 105 generates the transport stream TS including the video stream VS generated with the video encoder 104. The transmitting unit 106 transmits the transport stream TS through broadcast waves or with packets on a network to the receiving apparatus 200.

The operation of the transmitting apparatus 100 illustrated in FIG. 2 will be described briefly. The HDR video data obtained by the capture with the HDR camera 102 is supplied to the HDR opto-electrical transfer unit 103. The HDR video data obtained with the HDR camera 102 is graded with the master monitor 103a. The HDR opto-electrical transfer unit 103 obtains the transmission video data V1 by applying the opto-electrical transfer function for HDR images (HDR OETF curve) to the HDR video data. The transmission video data V1 is supplied to the video encoder 104.

The video encoder 104 obtains encoded video data by encoding the transmission video data V1, for example, with MPEG-4 AVC encoding, MPEG-2 video encoding, or HEVC encoding.

The video encoder 104 includes a stream formatter (not illustrated) at the latter part to generate a video stream (video elementary stream) VS including the encoded video data. At that time, the video encoder 104 inserts the luminance conversion acceptable range information about a set region in the screen and the luminance conversion acceptable range information about the entire screen into a layer of the video stream.

The video stream VS generated with the video encoder 104 is supplied to the system encoder 105. The system encoder 105 generates an MPEG-2 transport stream TS including the video stream. The transport stream TS is transmitted through broadcast waves or with packets on a network to the receiving apparatus 200 with the transmitting unit 106.

Exemplary Configuration of Receiving Apparatus

Figure 11:
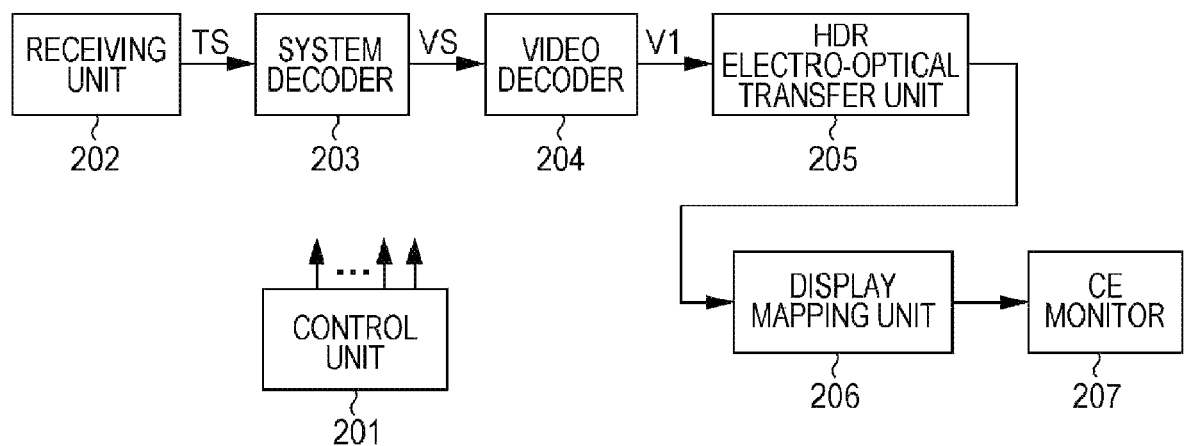
FIG. 11 is a block diagram of an exemplary configuration of a receiving apparatus including a transmitting and receiving system.

FIG. 11 illustrates an exemplary configuration of the receiving apparatus 200. The receiving apparatus 200 includes a control unit 201, a receiving unit 202, a system decoder 203, a video decoder 204, an HDR electro-optical transfer unit 205, a display mapping unit 206, and a CE monitor 207. The control unit 201 includes a Central Processing Unit (CPU) to control the operation of each of the components in the receiving apparatus 200 in accordance with a control program.

The receiving unit 202 receives the transport stream TS through broadcast waves or with packets on a network from the transmitting apparatus 100. The system decoder 203 extracts the video stream (elementary stream) VS from the transport stream TS. The system decoder 203 further extracts various types of information inserted in the layers of the container (transport stream) to transmit the information to the control unit 201.

The video decoder 204 decodes the video stream VS extracted with the system decoder 203 in a decoding process, and outputs the transmission video data V1. The video decoder 204 extracts the parameter set or SEI message inserted in each of the access units included in the video stream VS to transmit the parameter set or SEI message to the control unit 201.

The control unit 201 recognizes the OETF (opto-electrical transfer function) used on the transmitting end from the designation of the type of OETF in the video usability information (VUI) of the SPS to set an EOTF (electro-optical transfer function), for example, that is inverse to the OETF in the HDR electro-optical transfer unit 205.

The regional level mapping SEI message is one of the SEI messages extracted with the video decoder 204 and transmitted to the control unit 201. The control unit 201 may obtain the information of the "global_compliant_threshold_level" and "global_compliant_threshold_level_value" included in the luminance conversion acceptable range information about the entire screen from the regional level mapping SEI message. The control unit 201 may obtain also the information of the "region_compliant_threshold_level" and "region_compliant_threshold_level_value" included in the luminance conversion acceptable range information about a set region together with the information about the set region from the regional level mapping SEI message.

The HDR electro-optical transfer unit 205 obtains output video data for display an HDR image by applying, for example, an EOTF (electro-optical transfer function) that is inverse to the OETF (opto-electrical transfer function) in the HDR opto-electrical transfer unit 103 of the transmitting apparatus 100 to the transmission video data V1 output from the video decoder 204.

FIG. 12 illustrates an exemplary electro-optical transfer function (EOTF). In the drawing, the transmission code value corresponding to the vertical axis in FIG. 4 is shown on the horizontal axis. The output luminance level (display luminance level) corresponding to the horizontal axis in FIG. 4 is shown on the vertical axis. In the drawing, a solid line a is the EOTF curve. When the transmission code value is at the peak level MP, the output luminance level is PL. When the transmission code value is at the threshold level THP, the output luminance level is CL.

When the highest luminance display capacity of the CE monitor 207 is higher than the highest luminance PL assumed in the master monitor 103a in that case, the output luminance levels among which the transmission code values are higher than the threshold level THP are assigned to the range up to the display highest luminance level DP1 of the CE monitor 207 in a process in the display mapping unit 206 (luminance increasing process). In the drawing, an alternate long and two short dashes line b is an exemplary luminance conversion process in such a case.

On the other hand, when the highest luminance display capacity of the CE monitor 207 is lower than the highest luminance PL assumed in the master monitor 103a, the output luminance levels among which the transmission code values are higher than the threshold level THP are assigned to the range up to the display highest luminance level DP2 of the CE monitor 207 in a process in the display mapping unit 206 (luminance decreasing process). In the drawing, an alternate long and short dash line c is an exemplary luminance conversion process in such a case.

With reference to FIG. 11 again, the display mapping unit 206 converts the output luminance levels in the HDR electro-optical transfer unit 205 that exceed the threshold luminance CL in accordance with the highest luminance display capacity of the CE monitor 207, as described above. In that case, the display mapping unit 206 uses the luminance CL appropriate to the set region in the set region of a screen, and uses the luminance CL appropriate to the entire screen in the other regions of the screen.

In such a case, when the transmission code value is at the threshold level THP or lower, in other words, when the output luminance level is equal to or lower than the threshold luminance CL, the luminance is reproduced with fidelity to the luminance at the received level without depending on the CE monitor 207. Thus, for example, the texture of an object is represented correctly in accordance with the creator's intention. The CE monitor 207 displays an HDR image in accordance with the output video data from the display mapping unit 206.

When the highest luminance display capacity DP of the CE monitor 207 is higher than the highest luminance PL assumed in the master monitor 103a, in other words, when DP>PL holds, the display mapping unit 206 assigns the levels exceeding the threshold luminance CL to the range up to the peak luminance DP with a predetermined algorithm in a luminance increasing process.

Each of FIGS. 13A and 13B illustrates the display luminance characteristic of the CE monitor 207 when DP>PL holds. The characteristic includes the luminance conversion characteristic of the display mapping unit 206. In each of the drawings, the input luminance level is shown on the horizontal axis, and the display luminance level is shown on the vertical axis. FIG. 13A illustrates that the threshold luminance CL is set at a relatively small value CL (1). FIG. 13B illustrates that the threshold luminance CL is set at a relatively large value CL (2).

When the input luminance level is at the threshold luminance CL (1), the display luminance level is at the threshold level THP1. When the input luminance level is at the threshold luminance CL (2), the display luminance level is at the threshold level THP2. In other words, when the input luminance level is at a level up to the threshold luminance CL (1) or CL (2), the display luminance level is at the level that the creator intends. When the input luminance level is at the peak luminance PL, the display luminance level is at the peak level DP of the CE monitor 207. In other words, when the input luminance level is between the threshold luminance CL (1) or CL (2) and the peak luminance PL, a luminance increasing process is performed as denoted with a solid line L1 or L2.

When the highest luminance display capacity DP of the CE monitor 207 is lower than the highest luminance PL assumed in the master monitor 103a, in other words, when DP<PL holds, the display mapping unit 206 assigns the levels exceeding the threshold luminance CL to the range up to the peak luminance DP with a predetermined algorithm in a luminance decreasing process.

Each of FIGS. 14A and 14B illustrates the display luminance characteristic of the CE monitor 207 when DP<PL holds and the highest luminance display capacity DP is relatively high. The display luminance characteristic includes the luminance conversion characteristic of the display mapping unit 206. In each of the drawings, the input luminance level is shown on the horizontal axis, and the display luminance level is shown on the vertical axis.

FIG. 14A illustrates that the threshold luminance CL is set at a relatively small value CL (3). FIG. 14B illustrates that the threshold luminance CL is set at a relatively large value CL (4). When the input luminance level is at the threshold luminance CL (3), the display luminance level is at the threshold level THP3. When the input luminance level is at the threshold luminance CL (4), the display luminance level is at the threshold level THP4. In other words, when the input luminance level is at a level up to the threshold luminance CL (3) or CL (4), the display luminance level is at the level that the creator intends. When the input luminance level is at the peak luminance PL, the display luminance level is at the peak level DP of the CE monitor 207. In other words, when the input luminance level is between the threshold luminance CL (3) or CL (4) and the peak luminance PL, a luminance decreasing process is performed as denoted with a solid line L31 or L41.

Figure 15A:
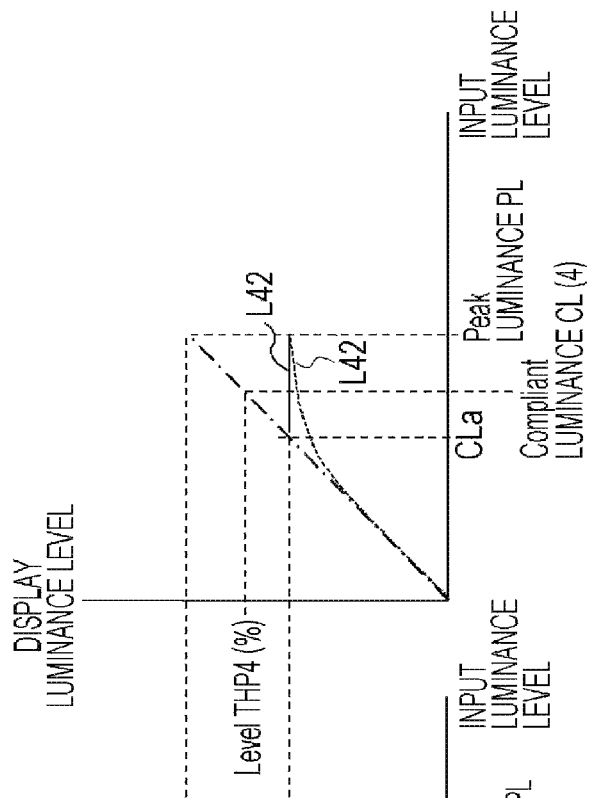
FIGS. 15A and 15B are diagrams of another exemplary display luminance characteristic of a CE monitor when the highest luminance display capacity DP of the CE monitor is lower than the highest luminance PL assumed in the master monitor.
Figure 15B:
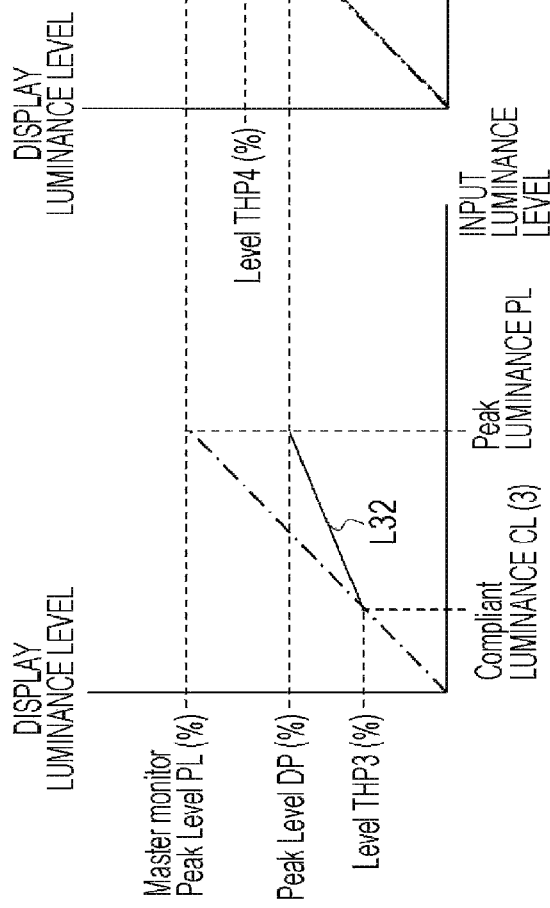

Each of FIGS. 15A and 15B illustrates the display luminance characteristic of the CE monitor 207 when DP<PL holds and the highest luminance display capacity DP is relatively low. The display luminance characteristic includes the luminance conversion characteristic of the display mapping unit 206. In each of the drawings, the input luminance level is shown on the horizontal axis, and the display luminance level is shown on the vertical axis.

FIG. 15A illustrates that the threshold luminance CL is set at a relatively small value CL (3) and the threshold level THP3 is lower than the peak level DP of the CE monitor 207. When the input luminance level is at the threshold luminance CL (3), the display luminance level is at the threshold level THP3. In other words, when the input luminance level is at a level up to the threshold luminance CL (3), the display luminance level is at the level that the creator intends. When the input luminance level is at the peak luminance PL, the display luminance level is at the peak level DP of the CE monitor 207. In other words, when the input luminance level is between the threshold luminance CL (3) and the peak luminance PL, a luminance decreasing process is performed as denoted with a solid line L32.

FIG. 15B illustrates that the threshold luminance CL is set at a relatively large value CL (4) and the threshold level THP4 is higher than the peak level DP of the CE monitor 207. When the input luminance level is at a value CLa smaller than the threshold luminance CL (4), the display luminance level is at the peak level DP of the CE monitor 207. In other words, when the input luminance level is at a level up to the threshold luminance CLa, the display luminance level is at the level that the creator intends in such a case. When the input luminance level is between the value CLa and the peak luminance PL, the display luminance level is, for example, at the peak level DP of the CE monitor 207 as denoted with solid line L42. Note that a display luminance conversion may be performed in such a case so as to vary the display luminance level smoothly on the high luminance side, for example, as denoted with a dashed line L42'.

The operation of the receiving apparatus 200 illustrated in FIG. 11 will be described briefly. The receiving unit 202 receives the transport stream TS from the transmitting apparatus 100 through broadcast waves or with packets on a network. The transport stream TS is supplied to the system decoder 203. The system decoder 203 extracts the video stream (elementary stream) VS from the transport stream TS.

The video stream VS extracted with the system decoder 203 is supplied to the video decoder 204. The video decoder 204 decodes the video stream VS extracted with the system decoder 203 in a decoding process to obtain the transmission video data V1. The video decoder 204 extracts the parameter set or SEI message inserted in each of the access units included in the video stream VS to transmit the extracted parameter set or SEI message to the control unit 201.

The control unit 201 obtains the information of "global_compliant_threshold_level" and "global_compliant_threshold_level_value" included in the luminance conversion acceptable range information about the entire screen from the regional level mapping SEI message. The control unit 201 further obtains the information of "region_compliant_threshold_level" and "region_compliant_threshold_level_value" included in the luminance conversion acceptable range information about each of the set regions together with the information about the set region from the regional level mapping SEI message.

The transmission video data V1 obtained with the video decoder 204 is supplied to the HDR electro-optical transfer unit 205. The HDR electro-optical transfer unit 205 obtains output video data for displaying an HDR image by applying, for example, an EOTF (electro-optical transfer function) that is inverse to the OETF (opto-electrical transfer function) of the HDR opto-electrical transfer unit 103 in the transmitting apparatus 100 to the transmission video data V1. The output video data is supplied to the display mapping unit 206.

The display mapping unit 206 coverts the output luminance levels exceeding the luminance CL in the HDR electro-optical transfer unit 205 in accordance with the highest luminance display capacity of the CE monitor 207. At that time, the display mapping unit 206 uses the luminance CL appropriate to the set region in the set regions of the screen, and uses the luminance CL appropriate to the entire screen in the other regions of the screen. The output video data is supplied from the display mapping unit 206 to the CE monitor 207. The CE monitor 207 displays an HDR image.

As described above, the transmission video data V1 obtained from opto-electrical transferred HDR video data is transmitted together with the luminance conversion acceptable range information about the set region in the screen in the transmitting and receiving system 10 illustrated in FIG. 1. Thus, the luminance of each of the set regions is independently converted in the luminance conversion acceptable range in accordance with the display luminance capacity of the CE monitor 207 on the receiving end. This can excellently reproduce the luminance atmosphere that the creator intends.

In the example in FIG. 7A, even when the luminance of the stars in the regions R1 and R3, and the neon-light sign in the region R2 are set at the same luminance level, the threshold level CL of the regions R1 and R3 is lower than the luminance level and the threshold level CL of the region R2 is higher than the luminance level.

In such a case, the luminance of the stars is included in the luminance conversion acceptable range and is to be display mapped, while the luminance of the neon-light sign is not included in the luminance conversion acceptable range and is not to be display mapped. Thus, the creator intentions to merely display the twinkle of the stars in the regions R1 and R3 and to maintain the texture of the neon-light sign even in the region R2 having a high luminance can excellently be reproduced on the receiving end.

The transmission video data V1 is transmitted together with the luminance conversion acceptable range information about the entire screen in addition to the luminance conversion acceptable range information about the set region in the screen in the transmitting and receiving system 10 illustrated in FIG. 1. This enables the receiving end to convert the luminance of the regions other than the set region in the screen in accordance with the luminance conversion acceptable range information about the entire screen in a luminance conversion process.

2. Variation

Note that, according to the embodiment, the luminance conversion acceptable range information about a predetermined number of set regions and the luminance conversion acceptable range information about the entire screen is placed in the regional level mapping SEI messages to transmit the information to the receiving end. However, only the luminance conversion acceptable range information about a predetermined number of set regions may be transmitted to the receiving end. In such a case, for example, prescribed luminance conversion acceptable range information is used in the regions other than the set regions in the screen on the receiving end.

The HDR electro-optical transfer unit 205 performs an electro-optical transfer process while the display mapping unit 206 performs a luminance conversion process in accordance with the highest luminance display capacity of the CE monitor 207 in the receiving apparatus 200 according to the embodiment. However, reflecting the luminance conversion characteristic on the electro-optical transfer function (EOTF) enables the HDR electro-optical transfer unit 205 to singly perform an electro-optical process and a luminance conversion process simultaneously.

Figure 16:
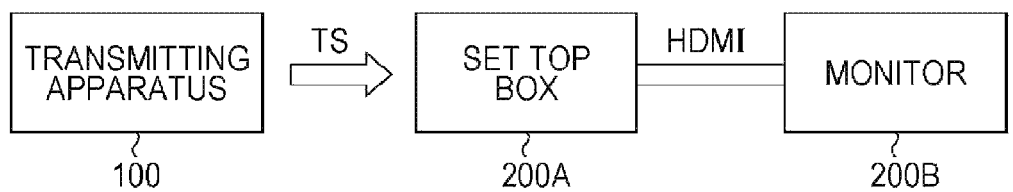
FIG. 16 is a block diagram of another exemplary configuration of the transmitting and receiving system.

The transmitting and receiving system 10 according to the embodiment includes the transmitting apparatus 100 and the receiving apparatus 200. However, the configuration of the transmitting and receiving system to which the present technology may be applied is not limited to the embodiment. For example, a television 200 may include a set top box 200A and a monitor 200B connected to each other via a digital interface such as a High-Definition Multimedia Interface (HDMI) as illustrated in FIG. 16. Note that the "HDMI" is a registered trademark.

In such a case, the set top box 200A may determine the highest luminance level of the monitor 200B in accordance with the information in EDID of the monitor 200B while obtaining the information via the HDMI when the set top box 200A performs a display mapping process.

Alternatively, when the monitor 200B performs a display mapping process, the set top box 200A and the monitor 200B can share the information by defining the level mapping SEI message, the type of EOTF, and the information about VUI in meta data such as the "Vender Specific Info Frame".

According to the embodiment, the transport stream (MPEG-2 TS) is used as a container. However, the present technology does not limit the transport stream to the transport stream TS. Even when another packet, for example, in ISO BMFF or MMT is used, the layers of video data can be implemented in the same manner as according to the embodiment.

Thus, the present technology may be applied to a system that distributes data to a receiving terminal via a network such as the Internet as well. When data is distributed via the Internet, a container in MP4 or another format is often used to distribute the data. In other words, containers in various format, for example, a transport stream (MPEG-2 TS) used as a digital broadcast standard, or MP4 used for distribution via the Internet may be used for the container according to the present technology.

The present technology can also be adopted the following configuration.

(1) A transmitting apparatus including:

a processing unit configured to obtain transmission video data by applying a predetermined opto-electrical transfer function to input video data, and a transmitting unit configured to transmit the transmission video data together with luminance conversion acceptable range information about a set region in a screen.

(2) The transmitting apparatus according to (1), wherein the transmitting unit transmits the transmission video data together with luminance conversion acceptable range information about an entire screen in addition to the luminance conversion acceptable range information about the set region in the screen.

(3) The transmitting apparatus according to (1) or (2), wherein the set region in the screen is set in a unit of pixel or in a unit of block including a predetermined number of pixels.

(4) The transmitting apparatus according to any of (1) to (3), further including:
an information inserting unit configured to insert the luminance conversion acceptable range information into a layer of a video stream obtained by encoding the transmission video data,
wherein the transmitting unit transmits the video stream.

(5) A transmitting method including:
obtaining transmission video data by applying a predetermined opto-electrical transfer function to input video data, and
transmitting, with a transmitting unit, the transmission video data together with luminance conversion acceptable range information about a set region in a screen.

(6) A receiving apparatus including:
a receiving unit configured to receive transmission video data obtained by applying a predetermined opto-electrical transfer function to input video data together with luminance conversion acceptable range information about a set region in a screen; and
a processing unit configured to obtain output video data by applying an electro-optical transfer function corresponding to the predetermined opto-electrical transfer function to the transmission video data, and converting luminance of the transmission video data in a luminance conversion process in accordance with the luminance conversion acceptable range information.

(7) The receiving apparatus according to (6), wherein the receiving unit receives the transmission video data together with luminance conversion acceptable range information about an entire screen in addition to the luminance conversion acceptable range information about the set region in the screen, and
the processing unit performs a luminance conversion process in a region other than the set region in the screen in accordance with the luminance conversion acceptable range information about the entire screen.

(8) The receiving apparatus according to (6) or (7), wherein the set region in the screen is set in a unit of pixel or in a unit of block including a predetermined number of pixels.

(9) The receiving apparatus according to any of (6) to (8), wherein the receiving unit receives video stream obtained by encoding the transmission video data, and
the luminance conversion acceptable range information is inserted in a layer of the video stream.

(10) A receiving method including:
receiving, with a receiving unit, transmission video data obtained by applying a predetermined opto-electrical transfer function to input video data together with luminance conversion acceptable range information about a set region in a screen; and
obtaining output video data by applying an electro-optical transfer function corresponding to the predetermined opto-electrical transfer function to the transmission video data, and converting luminance of the transmission video data in a luminance conversion process in accordance with the luminance conversion acceptable range information.

(11)
A transmitter comprising:
circuitry configured to implement
a processor that applies a predetermined opto-electrical transfer function to input image data to obtain output image data, and
store the output image data in association with context-determined luminance conversion range information regarding a sub-region of an image to be displayed.

(12)
The transmitter of 11, wherein the circuitry is further configured to transmit the output image data in association with the context-determined luminance conversion range information.

(13)
The transmitter of 11, wherein the output image data is video data, and the sub-region being a smaller region than a region covered by an entirety of a video frame.

(14)
The transmitter according to 12, wherein the transmitter transmits the output image data together with the context-determined luminance conversion range information about an entire image area of the image to be displayed in addition to the context-determined luminance conversion range information about the sub-region of the image to be displayed.

(15)
The transmitter according to 11, wherein the sub-region is defined in units of a pixel or in a pixel block that includes a predetermined number of pixels.

(16)
The transmitter according to 12, wherein the circuitry is further configured to insert the context-determined luminance conversion range information into a layer of a video stream obtained by encoding the output image data, and transmit the video stream via the transmitter.

(17)
A transmitting method comprising:
applying with circuitry a predetermined opto-electrical transfer function to input image data to obtain output image data, and
store the output image data in association with a context-determined luminance conversion range information regarding a sub-region of an image to be displayed.

(18)
The transmitting method of 17, further comprising:
inserting the context-determined luminance conversion range information into a layer of a video stream obtained by encoding the output image data, and transmitting the video stream.

(19)
The transmitting method of 17, wherein the image data is video data, and the sub-region being a smaller region than a region covered by an entirety of a video frame of a video image to be displayed.

(20)
A receiver comprising:
circuitry configured to
receive image data from another device that applied a predetermined opto-electrical transfer function to input image data and stored output image data in association with a context-determined luminance conversion range for a sub-region of an image to be displayed, and
apply an electro-optical transfer function, which corresponds to the predetermined opto-electrical transfer function, to the output image data received from the another device, and convert a luminance of the output image data received from the another device in a luminance conversion process in accordance with the context-determined luminance conversion range information.

(21)
The receiver of 20, wherein the output image data is video data, and the sub-region being a smaller region than a region covered by an entirety of a video frame.

(22)
The receiver according to 20, wherein the circuitry is further configured to receive the output image data together with context-determined luminance conversion range information for an entire image area in addition to the context-determined luminance conversion range information for the sub-region of the entire image area, and
the circuitry is further configured to perform a luminance conversion process in a region other than the sub-region in accordance with the context-determined luminance conversion range information for the entire image area.

(23)
The receiver according to 22, wherein the sub-region is defined in units of a pixel or in a pixel block that includes a predetermined number of pixels.

(24)
The receiver according to 22,
wherein the circuitry is configured to receive a video stream that includes the output image data, and
the context-determined luminance conversion range information.

(25)
A receiving method comprising:
receiving, with a receiver, image data from another device that applied a predetermined opto-electrical transfer function to input image data and stored the image data in association with a context-determined luminance conversion range for a sub-region of an image to be displayed; and
obtaining with circuitry output video data by applying an electro-optical transfer function corresponding to the predetermined opto-electrical transfer function to the image data, and converting luminance of the image data in a luminance conversion process in accordance with the context-determined luminance conversion range information.

(26)
The method of 25, wherein the image data is video data, and the sub-region being a smaller region than a region covered by an entirety of a video frame.

(27)
The method according to 25, further comprising:
receiving the image data together with context-determined luminance conversion range information for an entire image area in addition to the context-determined luminance conversion range information for the sub-region of the entire image area, and
performing with the circuitry a luminance conversion process in a region other than the sub-region in accordance with the context-determined luminance conversion range information for the entire image area.

(28)
The method according to 25, wherein the sub-region is defined in units of a pixel or in a pixel block that includes a predetermined number of pixels.

(29)
The method according to 25,
further comprising:
receiving a video stream that includes the image data, the context-determined luminance conversion range information.

According to a primary feature of the present technology, the transmission video data obtained from electro-optical transferred HDR video data is transmitted together with the luminance conversion acceptable range information about the set regions in the screen, and the luminance of each of the set regions in a screen is independently converted only in the luminance conversion acceptable range on the receiving end. This can excellently reproduce the luminance atmosphere that the creator intends (See FIGS. 5 to 9).

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

10, 10A Transmitting and receiving system
100 Transmitting apparatus
101 Control unit
102 HDR camera
103 HDR opto-electrical transfer unit
103a Master monitor
104 Video encoder
105 System encoder
106 Transmitting unit
200 Receiving apparatus
200A Set top box
200B Monitor
201 Control unit
202 Receiving unit
203 System decoder
204 Video decoder
205 HDR electro-optical transfer unit
206 Display mapping unit
207 CE monitor

The invention claimed is:
1. A receiver, comprising:
circuitry configured to:
receive transmission image data and a control message via broadcast or network, the transmission image data being generated by applying a predetermined opto-electrical transfer function to input image data of a high dynamic range image, and the control message including a first mapping threshold and a first mapping value corresponding to the first mapping threshold;
generate converted image data based on the received transmission image data by
performing a first conversion on a first luminance level within a sub-region of an image represented by the transmission image data when the first luminance level is less than the first mapping threshold,
converting the first luminance level to the first mapping value when the first luminance level equals the first mapping threshold, and
performing a second conversion on the first luminance level within the sub-region of the image when the first luminance level is greater than the first mapping threshold; and
display a converted image on a display according to the converted image data.

2. The receiver of claim 1, wherein the circuitry is further configured to:
simultaneously apply an electro-optical transfer function and a luminance conversion to the received transmission image data to obtain the converted image data,
the electro-optical transfer function corresponding to the predetermined opto-electrical transfer function, and the luminance conversion corresponding to at least the first conversion or the second conversion.

3. The receiver of claim 1, wherein the control message includes coordinate information specifying coordinates of corner pixels of the sub-region of the image.

4. The receiver of claim 1, wherein the first mapping threshold and the first mapping value are applicable to the sub-region of the image that is smaller than an entirety of the image, and the control message further includes a second mapping threshold applicable to the entirety of the image.

5. The receiver of claim 4, wherein the control message further includes a second mapping value corresponding to the second mapping threshold, and the circuitry is configured to generate the converted image data based on the received transmission image data further by
performing a third conversion on a second luminance level within a region of the image other than the sub-region when the second luminance level is less than the second mapping threshold,
converting the second luminance level to the second mapping value when the second luminance level equals the second mapping threshold, and
performing a fourth conversion on the second luminance level within the region of the image when the second luminance level is greater than the second mapping threshold.

6. The receiver of claim 1, wherein the circuitry is configured to:
receive a video stream; and
extract the transmission image data and the control message from the received video stream.

7. A receiving method, comprising:
receiving transmission image data and a control message via broadcast or network, the transmission image data being generated by applying a predetermined opto-electrical transfer function to input image data of a high dynamic range image, and the control message including a first mapping threshold and a first mapping value corresponding to the first mapping threshold;
generating, by circuitry of a receiving device, converted image data based on the received transmission image data, including
performing a first conversion on a first luminance level within a sub-region of an image represented by the transmission image data when the first luminance level is less than the first mapping threshold,
converting the first luminance level to the first mapping value when the first luminance level equals the first mapping threshold, and
performing a second conversion on the first luminance level within the sub-region of the image when the first luminance level is greater than the first mapping threshold; and
displaying a converted image on a display according to the converted image data.

8. The receiving method of claim 7, wherein the generating the converted image data based on the received transmission image data further comprises:
simultaneously applying an electro-optical transfer function and a luminance conversion to the received transmission image data to obtain the converted image data, the electro-optical transfer function corresponding to the predetermined opto-electrical transfer function, and the luminance conversion corresponding to at least the first conversion or the second conversion.

9. The receiving method of claim 7, wherein the control message includes coordinate information specifying coordinates of corner pixels of the sub-region of the image.

10. The receiving method of claim 7, wherein the first mapping threshold and the first mapping value are applicable to the sub-region of the image that is smaller than an entirety of the image, and the control message further includes a second mapping threshold applicable to the entirety of the image.

11. The receiving method of claim 10, wherein the control message further includes a second mapping value corresponding to the second mapping threshold, and the generating the converted image data based on the received transmission image data further comprises:
performing a third conversion on a second luminance level within a region of the image other than the sub-region when the second luminance level is less than the second mapping threshold,
converting the second luminance level to the second mapping value when the second luminance level equals the second mapping threshold, and
performing a fourth conversion on the second luminance level within the region of the image when the second luminance level is greater than the second mapping threshold.

12. The receiving method of claim 7, further comprising:
receiving a video stream; and
extracting the transmission image data and the control message from the received video stream.

13. A transmitter, comprising:
circuitry configured to:
apply a predetermined opto-electrical transfer function to input image data of a high dynamic range image to obtain transmission image data;
generate a control message that includes a first mapping threshold and a first mapping value corresponding to the first mapping threshold, a luminance level within a sub-region of an image represented by the transmission image data is
subject to a first conversion processed by a receiver when the first luminance level is less than the first mapping threshold,
subject to having the first mapping value as a first conversion output when the first luminance level equals the first mapping threshold, and
subject to a second conversion processed by the receiver when the first luminance level is greater than the first mapping threshold; and
transmit the transmission image data and the control message to the receiver.

14. The transmitter of claim 13, wherein the circuitry is configured to generate the control message that includes coordinate information specifying coordinates of corner pixels of the sub-region of the image.

15. The transmitter of claim 13, wherein the first mapping threshold and the first mapping value are applicable to the sub-region of the image that is smaller than an entirety of the image, the circuitry is configured to generate the control message that further includes a second mapping threshold applicable to the entirety of the image and a second mapping value corresponding to the second mapping threshold, and a second luminance level within a region of the image represented by the transmission image data other than the sub-region is
subject to a third conversion processed by the receiver when the second luminance level is less than the second mapping threshold,
subject to having the second mapping value as a second conversion output when the second luminance level equals the second mapping threshold, and
subject to a fourth conversion processed by the receiver when the second luminance level is greater than the second mapping threshold.

16. The transmitter of claim 13, wherein the circuitry is further configured to:
insert the control message into a layer of a video stream obtained by encoding the transmission image data; and
transmit the video stream to the receiver.

17. A transmitting method, comprising:
applying a predetermined opto-electrical transfer function to input image data of a high dynamic range image to obtain transmission image data;
generating, by circuitry of a transmitter, a control message that includes a first mapping threshold and a first mapping value corresponding to the first mapping threshold, a first luminance level within a sub-region of an image represented by the transmission image data is
subject to a first conversion processed by a receiver when the first luminance level is less than the first mapping threshold,
subject to having the first mapping value as a first conversion output when the first luminance level equals the first mapping threshold, and
subject to a second conversion processed by the receiver when the first luminance level is greater than the first mapping threshold; and
transmitting, by the circuitry, the transmission image data and the control message to the receiver.

18. The transmitting method of claim 17, wherein the generating the control message comprises including in the control message coordinate information specifying coordinates of corner pixels of the sub-region of the image.

19. The transmitting method of claim 17, wherein
the first mapping threshold and the first mapping value are applicable to the sub-region of the image that is smaller than an entirety of the image,
the generating the control message comprises including in the control message a second mapping threshold applicable to the entirety of the image and a second mapping value corresponding to the second mapping threshold, and
a second luminance level within a region of the image represented by the transmission image data other than the sub-region is
subject to a third conversion processed by the receiver when the second luminance level is less than the second mapping threshold,
subject to having the second mapping value as a second conversion output when the second luminance level equals the second mapping threshold, and
subject to a fourth conversion processed by the receiver when the second luminance level is greater than the second mapping threshold.

20. The transmitting method of claim 17, further comprising:
inserting the control message into a layer of a video stream obtained by encoding the transmission image data; and
transmitting the video stream to the receiver.

* * * * *